Sept. 27, 1932.  E. KOCH  1,879,323
AIRCRAFT
Filed July 16, 1931  3 Sheets-Sheet 1

Inventor
Emery Koch
By Clarence A. O'Brien
Attorney

Sept. 27, 1932.   E. KOCH   1,879,323
AIRCRAFT
Filed July 16, 1931   3 Sheets-Sheet 2
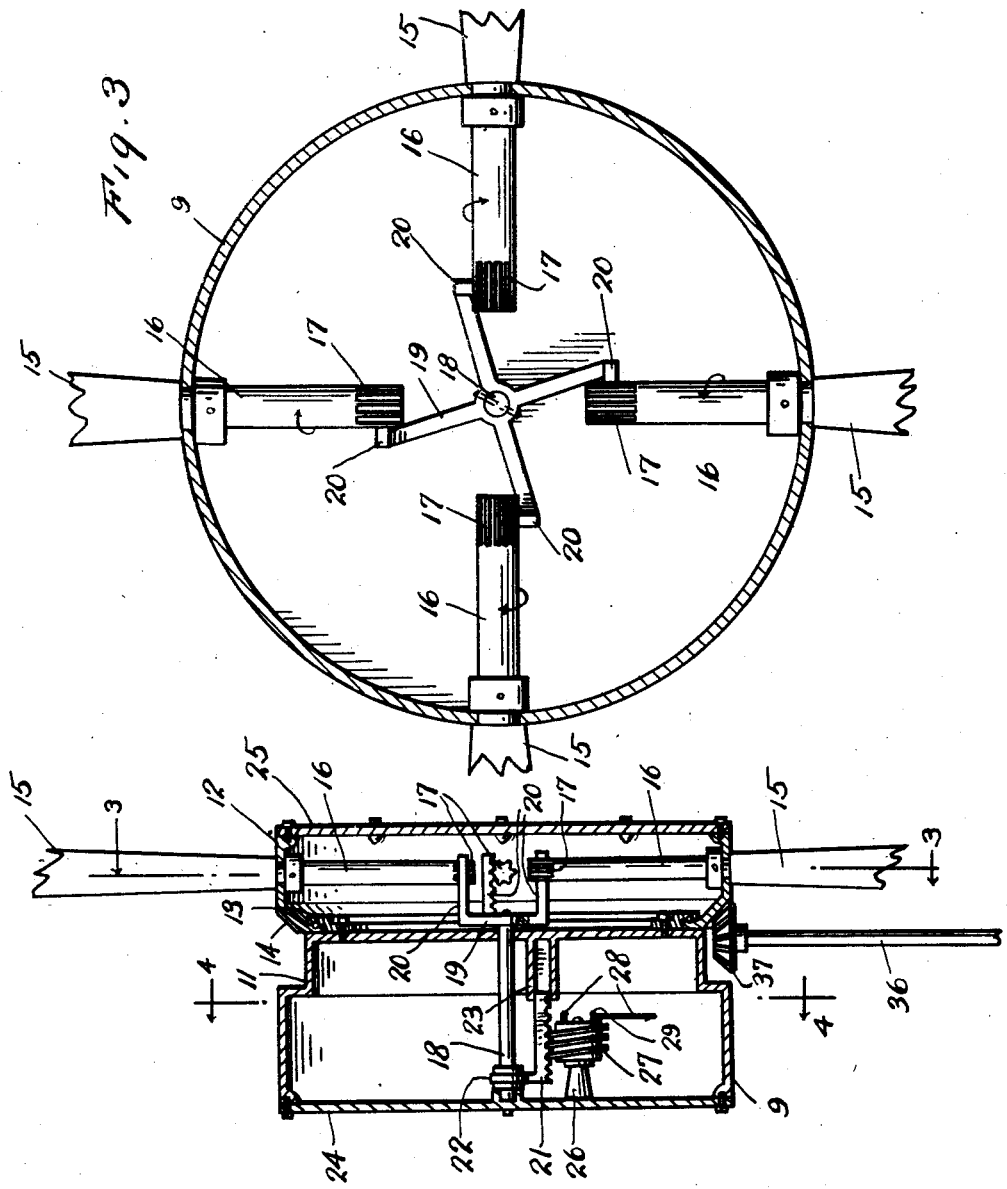

Sept. 27, 1932.  E. KOCH  1,879,323
AIRCRAFT
Filed July 16, 1931   3 Sheets-Sheet 3
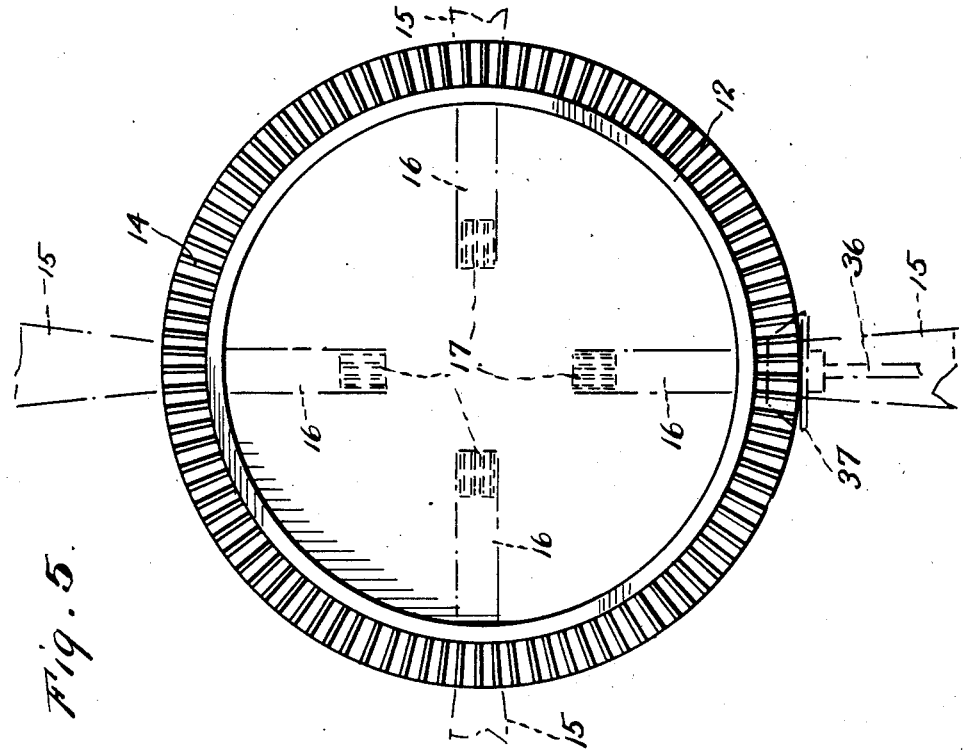
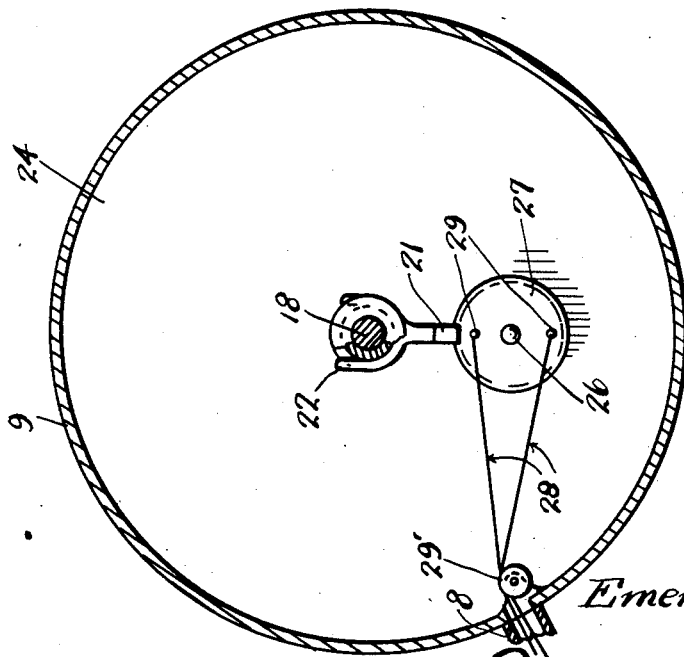
Inventor
*Emery Koch*
By *Clarence A. O'Brien*
Attorney Patented Sept. 27, 1932

1,879,323

UNITED STATES PATENT OFFICE

EMERY KOCH, OF MARACAIBO, VENEZUELA

AIRCRAFT

Application filed July 16, 1931. Serial No. 551,271.

This invention relates to new and useful improvements in aircraft and more particularly to devices of this character of the helicopter type and has for its primary object to provide, in a manner as hereinafter set forth, an aircraft embodying novel steering means for controlling the direction of movement thereof.

Other objects of the invention are to provide an aircraft of the character described which will be simple in construction, strong, durable, efficient and reliable in use, economical to operate and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 2 is a vertical sectional view through the steering means for directing the aircraft to the right or to the left.

Figure 3 is a view in vertical section taken substantially on the line 3—3 of Figure 2.

Figure 4 is a view in vertical section taken substantially on the line 4—4 of Figure 2.

Figure 5 is a view in elevation of the hub portion of the steering unit looking at the side thereof which is provided with the ring gear.

Figure 1:
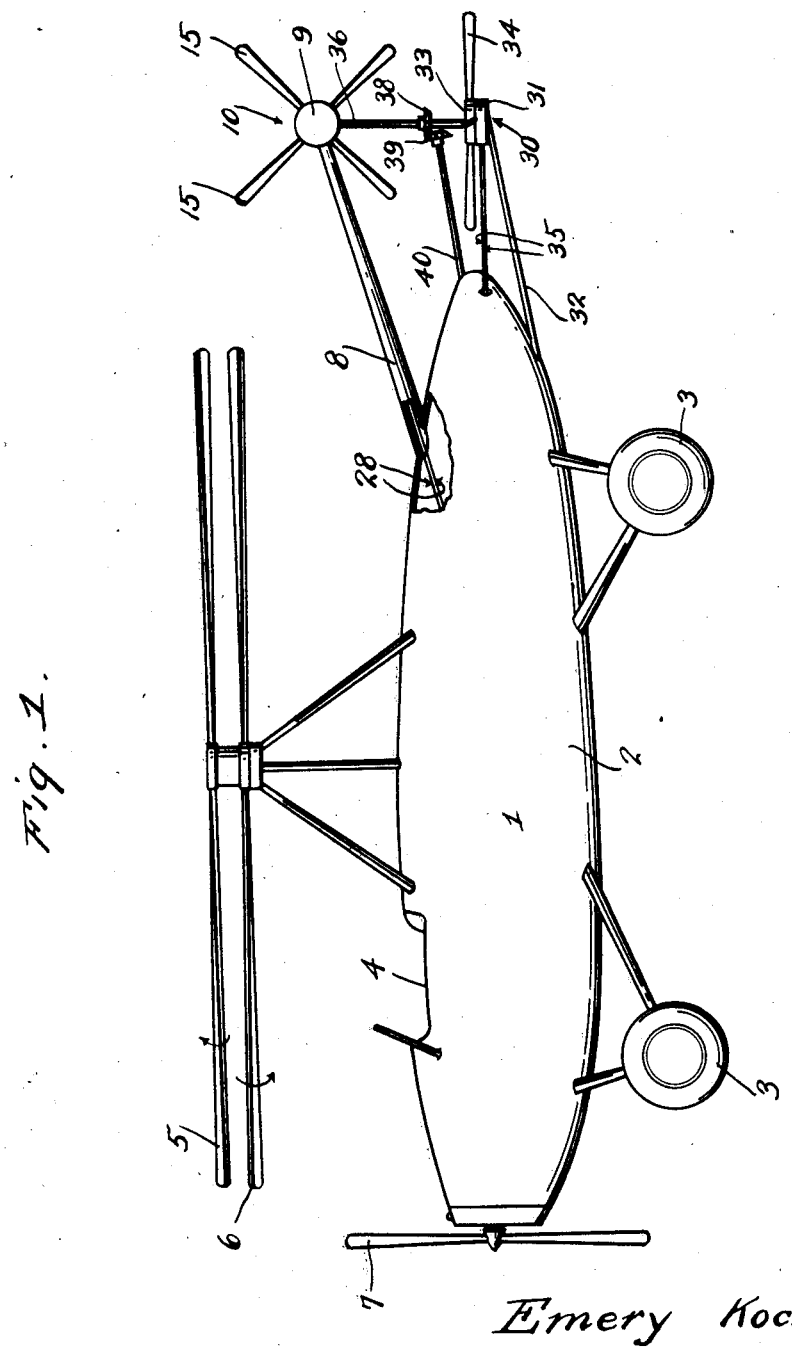
Figure 1 is a view in side elevation partially broken away in section of an aircraft in accordance with this invention.

Referring now to the drawings in detail, it will be seen that the aircraft is designated generally by the reference numeral 1 and comprises a body or fuselage 2 having suitable landing wheels 3 thereon and a cockpit 4. Disposed above the body or fuselage 2 for rotation in opposite directions in a horizontal plane are the upper and lower lifting propellers 5 and 6 respectively which are operatively connected to a power plant (not shown) in the fuselage or body 2 in any suitable manner. The usual tractor propeller 7 is mounted on the nose of the fuselage or body 2 and operatively connected to the power plant in the usual manner for pulling the aircraft forward, as will be understood.

A tubular arm 8 is rigidly mounted on a rear portion of the fuselage body 2 and projects rearwardly and upwardly therefrom and has rigidly mounted on its rear or free end an annular casing 9 which is vertically disposed. The housing 9 is an element of a steering unit which is designated generally by the reference numeral 10. The housing 9 is, as best seen in Figure 2 of the drawings, provided with a reduced end portion 11 upon which is mounted co-axially for rotation an annular hub 12. The inner side of the hub 12 is in the form of an inturned flange disposed against the adjacent end of the housing 10 and rotatably secured thereon by a retaining ring 13, friction reducing balls being interposed between the rings 13 and the inturned flange of the hub. The inner portion of the hub 12 is also formed to provide a beveled gear 14, the purpose of which will be presently set forth.

Radiating propellers 15 are provided with shafts 16 which are journaled in the periphery of the hub 12, the shafts 16 projecting into the hub and terminating in toothed inner end portions 17. A shaft 18 is disposed in the housing 9 and extends slidably into the hub 12 and has fixed on one end portion in the hub 12 a spider 19 having the right angularly disposed rack bars 20 on the free ends of its legs which are oppositely engaged with the teeth 17 on the propeller shafts 16. The shaft 18 is, of course, rotatable. A rack bar 21 has a yoke 22 on one end engaged with the shaft 18 in a manner to slide said shaft upon actuation of the rack bar 21. The rack bar 21 is slidable in a sleeve 23 provided therefor in the housing 9. The housing 9 includes a removable end plate 24 and the hub 12 includes a removable end plate 25. A bracket 26 is mounted on the removable end plate 24 of the housing 9 within said housing 9 and mounted for rotation thereon is a worm gear 27 which meshes with the rack bar 21. Operating cables or the like 28 are connected at one end to the pins 29 which project from one end of the worm gear 27 on diametrically opposite sides of its axis. These cables 28 are trained over suitable pulleys, such as 29, and extend through the tubular arm 8 into the fuselage or body 2 for actuation by the pilot or any other person.

When the worm gear 27 is rotated through the medium of the cables 28, the rack bar 21 is actuated to shift the shaft 18, thus rotating the propellers 15 through the medium of the rack bars 20 on the free ends of the legs of the spider 19, which, in turn, is fixed on the shaft 18. Thus, the blades 15 may be reversed.

An elevator unit is designated generally by the reference numeral 30 and, with the exception that the same is disposed horizontally, is substantially identical in construction with the steering unit 10. The elevating unit 30 comprises a housing 31 which is mounted on a rearwardly and upwardly extending arm 32 which projects from the fuselage or body 2. The elevating unit 30 further includes a hub 33 from which the rotatable propellers 34 radiate. The cables 35 which rotate the propellers 34 in the hub 33 pass through an opening in the rear end portion of the fuselage or body 2 and traverse the space between said fuselage and the unit 30 and enter the housing 31 of said unit 30 through an opening provided therefor.

The reference numeral 36 designates a shaft having its lower end fixed centrally in the hub 33 of the elevating unit 30. The upper end portion of the vertical shaft 36 has fixed thereon a beveled gear 37 which meshes with the gear 14 formed on the inner portion of the hub 12. In this manner the hub portions 12 and 33 of the units 10 and 30 respectively are operatively connected to the shaft 36 for actuation thereby. A beveled gear 38 is fixed on an intermediate portion of the vertical shaft 36 and is in mesh with a beveled gear 39 which is fixed on the rear end portion of a drive shaft 40 which extends into the fuselage or body 2 and is operatively connected with a suitable power plant for actuation thereby.

Through the medium of the cables 35, the propeller blades 34 may be reversed in a manner to direct the aircraft upwardly or downwardly as desired.

It is believed that the many advantages of an aircraft in accordance with this invention will be readily understood, and although the preferred embodiment of the invention is as illustrated and described, it is to be understood that changes in the details of construction and in the combination and arrangement of parts may be resorted to which will fall within the scope of the invention as claimed.

What is claimed is:

1. In a steering mechanism for aircraft including elevating means; a rudder mechanism comprising a propeller arranged on a plane extending longitudinally and vertically through the longitudinal axis of the aircraft, said rudder mechanism including a hub, a plurality of blades, each of the blades being rotatably mounted on the hub, and provided with gear teeth at its inner end, a rack assembly meshing with the teeth at the inner ends of the blades, a rack bar carried by the rack assembly and a manually operative worm meshing with the said rack bar, whereby the pitch of the blade can be reversed and drive means for rotating the hub.

2. In a steering mechanism for aircraft including elevating means; a rudder mechanism comprising a propeller arranged on a plane extending longitudinally and vertically through the longitudinal axis of the aircraft, said rudder mechanism including a hub, a plurality of blades, each of the blades being rotatably mounted on the hub, and provided with gear teeth at its inner end, a rack assembly meshing with the teeth at the inner ends of the blades, and remotely controlled means for actuating the said rack assembly, whereby the pitch of the blade can be reversed and drive means for rotating the hub, said rack assembly comprising a stationary housing to which the hub is swivelly connected, a slide shaft, a rack carried by the shaft, a worm meshing with the rack, said remotely controlled means including a cable attached to the worm, and a plurality of rack extensions at one end of the shaft for mesh with the inner ends of the blades.

In testimony whereof I affix my signature.

EMERY KOCH.